US007662034B2

(12) United States Patent
Van Hillo et al.

(10) Patent No.: US 7,662,034 B2
(45) Date of Patent: Feb. 16, 2010

(54) APPARATUS FOR SEVERING A DRUMSTICK AND A THIGH FROM EACH OTHER

(75) Inventors: Eric Adriaan Van Hillo, Oostzaan (NL); Eric De Jong, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 612 days.

(21) Appl. No.: 11/066,870

(22) Filed: Feb. 25, 2005

(65) Prior Publication Data
US 2005/0221748 A1 Oct. 6, 2005

(30) Foreign Application Priority Data
Mar. 8, 2004 (NL) ................................ 1025657

(51) Int. Cl.
*A22C 21/00* (2006.01)
(52) U.S. Cl. .................. 452/167; 452/155; 452/182
(58) Field of Classification Search ........... 452/149, 452/154, 155, 166, 167, 177, 182
See application file for complete search history.

(56) References Cited
U.S. PATENT DOCUMENTS

| 1,338,452 | A |   | 4/1920  | Hunsinger, Sr. |         |
|-----------|---|---|---------|----------------|---------|
| 2,068,137 | A |   | 1/1937  | Jaeger         |         |
| 2,846,718 | A | * | 8/1958  | Sengelaub et al. | 452/167 |
| 3,323,164 | A | * | 6/1967  | Bonuchi et al. | 452/167 |
| 3,364,515 | A | * | 1/1968  | Brown et al.   | 452/167 |
| 4,480,353 | A | * | 11/1984 | Martin et al.  | 452/166 |
| 4,635,317 | A | * | 1/1987  | van der Eerden | 452/167 |
| 4,660,256 | A | * | 4/1987  | Innes et al.   | 452/167 |
| 5,015,213 | A |   | 5/1991  | Hazenbroek     |         |
| 5,019,013 | A |   | 5/1991  | Hazenbroek     |         |
| 5,080,632 | A | * | 1/1992  | Clifford       | 452/182 |
| 5,173,077 | A | * | 12/1992 | van den Nieuwelaar et al. | 452/163 |
| 5,176,562 | A | * | 1/1993  | Martin et al.  | 452/136 |
| 5,248,277 | A | * | 9/1993  | Bos et al.     | 452/125 |
| 5,273,485 | A |   | 12/1993 | Hegelmann et al. |       |
| 5,302,149 | A |   | 4/1994  | Witham et al.  |         |
| 5,306,203 | A | * | 4/1994  | Martin et al.  | 452/182 |
| 5,733,184 | A |   | 3/1998  | Curry et al.   |         |
| 5,890,956 | A | * | 4/1999  | Habenicht et al. | 452/167 |
| 7,059,954 | B2| * | 6/2006  | Annema et al.  | 452/136 |
| 7,070,493 | B2|   | 7/2006  | Hazenbroek et al. |      |

FOREIGN PATENT DOCUMENTS

EP  0442554 A1  8/1991
EP  0757893 A1  2/1997

OTHER PUBLICATIONS

EPO Search Report, Oct. 13, 2004.

* cited by examiner

*Primary Examiner*—David J Parsley
(74) *Attorney, Agent, or Firm*—Dority & Manning, P.A.

(57) ABSTRACT

An apparatus for severing a drumstick and a thigh that are part of a leg of poultry from each other includes an overhead conveyor for supplying the suspended leg, a supporting member for supporting the leg while the drumstick and thigh are being severed, and a cutting device for severing the drumstick from the thigh at the height of a knee joint A clamping device is provided for holding fast the thigh at least while it passes the cutting device.

20 Claims, 7 Drawing Sheets

APPARATUS FOR SEVERING A DRUMSTICK AND A THIGH FROM EACH OTHER

FIELD OF THE INVENTION

The invention relates to an apparatus for severing a drumstick and a thigh that are part of a leg of poultry from each other, comprising an overhead conveyor for supplying the suspended leg, a supporting member for supporting the leg while the drumstick and thigh are being severed, and a cutting device for severing the drumstick from the thigh at the height of a knee joint.

BACKGROUND

Such an apparatus is known from the European patent EP-B-0 858 740.

In the known apparatus, a leg of poultry, e.g. chicken, suspended in a hook of an overhead conveyor is conveyed to a supporting wheel provided with recesses into which at least part of the leg is received for support. Below and above the support wheel, the known apparatus is further provided with a guide rail such that the leg at the height of the knee joint connecting the drumstick with the thigh, is caused to bend around the support wheel.

In the course of the support wheel's rotation, the bent legs pass a cutting device, more specifically a rotating blade, with which the drumstick and thigh are severed from each other at the height of the knee joint.

A drawback of the known apparatus is that the positioning of the drumstick and thigh after the same have been severed cannot be guaranteed, which renders a continuation of automatic processing of the drumstick and thigh more difficult.

SUMMARY

A first object of the invention is to eliminate the noted drawback of the known apparatus.

A second object of the invention is to provide an alternative apparatus for severing a drumstick and a thigh from each other.

Still another object of the invention is to provide an apparatus that better meets practical requirements, such as simple construction, little critical processing path, easy maintenance and low costs.

Additional objects and advantages of the invention will be set forth in part in the following description, or may be obvious from the description, or may be learned through practice of the invention Objectives and other advantages of the invention are achieved with an apparatus that is characterized by one or several of the following claims.

In a first aspect of the invention, the apparatus is characterized in that a clamping device is provided for holding fast the thigh at least while it passes the cutting device.

Surprisingly, it was shown that with this apparatus the drumstick and thigh can be severed relatively precisely despite a natural variation in the length of the legs.

In order to ensure a controlled processing path for severing the drumstick and thigh, it is desirable for the clamping device to hold fast the thigh immediately prior to, during, and immediately after it passes the cutting device.

The apparatus is preferably embodied such that the overhead conveyor comprises a trolley with a hook for the leg of the poultry suspended therefrom, and that during operation the clamping device moves synchronously with the trolley.

In this way, the leg is fixed at both the thigh portion and the drumstick portion, which fixation can be maintained during the severing of the drumstick and thigh and thereafter. Moreover, this form of attachment does not cause any damage to the drumstick or thigh.

Conveniently, the apparatus is embodied such that the cutting device is disposed in a plane between the hook and the clamping device. The cutting device may, for example, be embodied as a rotating blade, which is known in itself, disposed in the horizontal plane or at a slight angle in relation to the horizontal plane.

The supporting member is disposed below the hook so as to support the drumstick in the direction of the cutting device, thereby promoting a precise severing of the drumstick and thigh.

A further distinguishing feature of the apparatus according to the invention is that at least while passing the cutting device, the drumstick and thigh substantially maintain their natural angle in relation to each other. Applicants believe that this aspect contributes to the precision of severing drumstick and thigh, despite the different lengths naturally occurring in the poultry legs being severed in the apparatus.

It may be advantageous for the clamping device to be adjustable in height. If there is much variation in leg length, the clamping device may be positioned at a height so as to allow thigh clamping to occur with precision.

For the severing process to progress as much as possible automatically, it is desirable that a detection device be provided for signaling the drumstick-thigh transition, and that the adjustment of the height of the clamping device be dependent thereon.

Hereinbelow, the invention will be further elucidated by way of an exemplary embodiment and with reference to the drawing, which do not limit the appended claims.

BRIEF DESCRIPTION OF THE DRAWINGS

Identical reference numerals used in the figures refer to similar components.

DESCRIPTION

Figure 1:
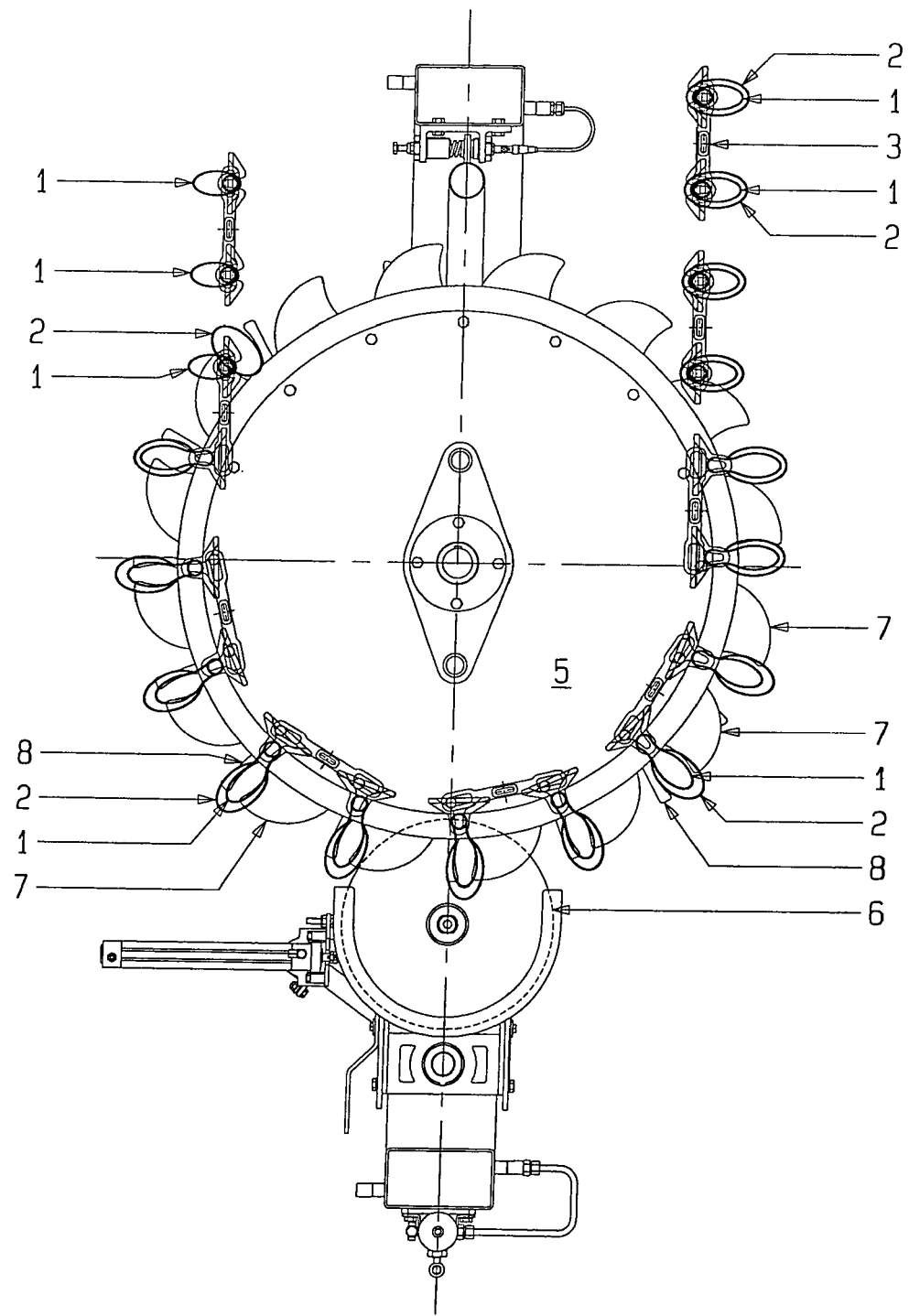
FIG. 1 shows an embodiment of the apparatus according to the invention in a top view.

Reference will now be made in detail to one or more embodiments of the invention, at least one example of which is illustrated in the drawings. The embodiments are presented for purposes of explaining aspects of the invention, and are not meant as a limitation of the invention. For example, features illustrated or described as part of one embodiment may be used with another embodiment to yield still a further embodiment.

FIG. 1 shows a top view of an embodiment of the apparatus according to the invention for severing a drumstick and a thigh of a leg of poultry.

This apparatus possesses an overhead conveyor, which is known in itself, for supplying a suspended poultry leg comprising a drumstick 1 and a thigh 2. The drumstick 1 and the thigh 2 are connected with each other and are suspended from a hook 3 disposed below a trolley 4 of the overhead conveyor (this is clearly shown in FIG. 3).

The apparatus according to the invention further possesses a supporting member 5 whose function and workings will be explained hereinbelow and which serves for the support of the leg 1, 2 during the severing of drumstick 1 and thigh 2.

The apparatus is further provided with a cutting device 6 which may be embodied, for example, as a rotating blade and which serves for severing drumstick 1 from thigh 2 at the height of a knee joint in the leg 1, 2.

FIG. 1 further shows that the apparatus is provided with a clamping device for holding fast the thigh 2, at least while passing the cutting device 6.

The clamping device is equipped with clamping chucks 7, of which there are always two placed above one another, such as to create a slot. At the height of said slot a clamping plate 8 is provided, which on activation interacts with the clamping chucks 7 enabling it to clamp the thigh 2 of the leg 1, 2 without thereby applying a tilting moment to the leg 1, 2.

In FIG. 1 it has already been clearly shown that the clamping device 7, 8 holds fast the thigh 2 immediately prior to, during, and immediately after passing the cutting device 6.

Figure 2:
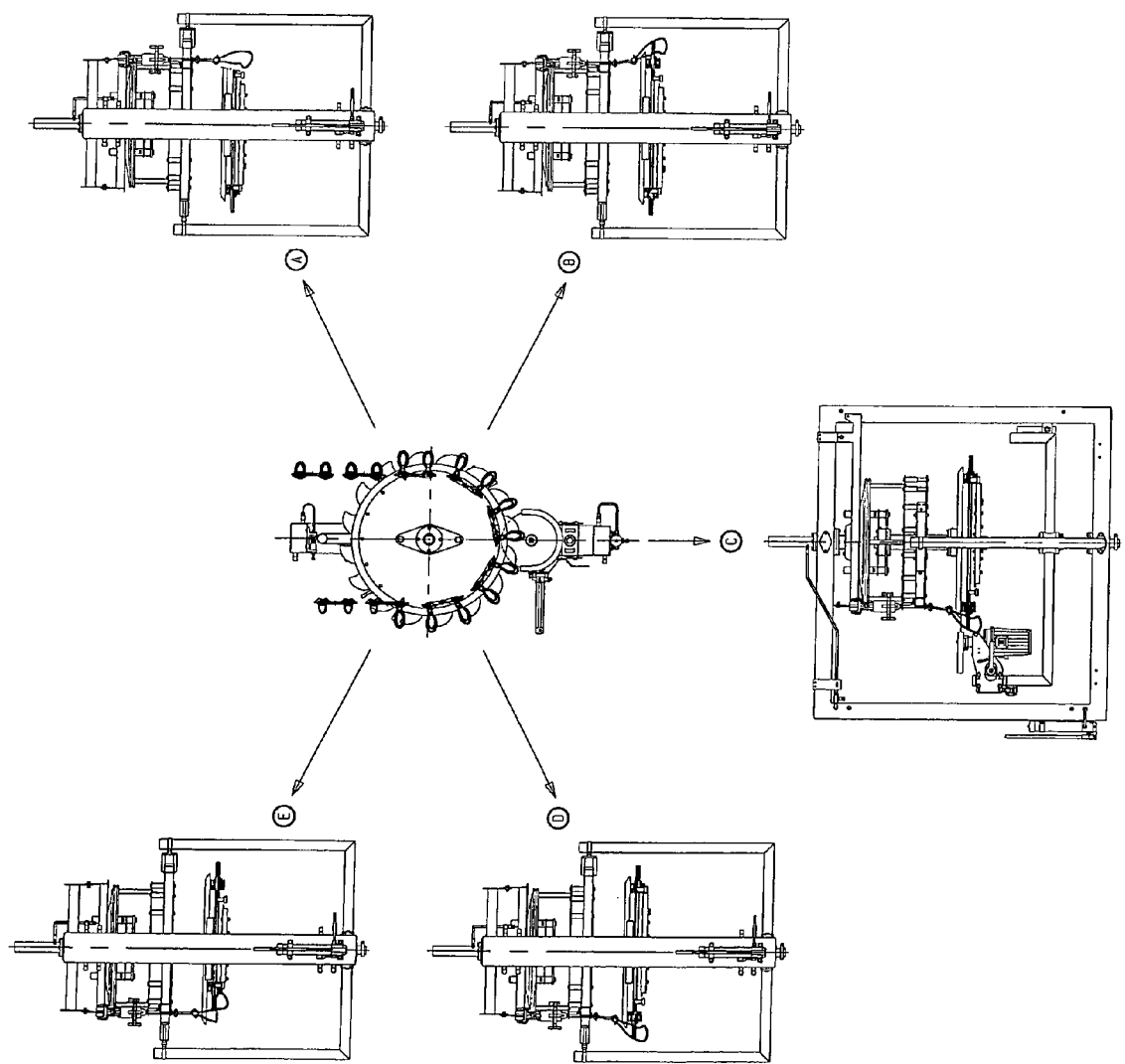
FIG. 2 shows a combination of an embodiment of the apparatus according to the invention in a top view and various side elevations A to E.
Figure 3A:
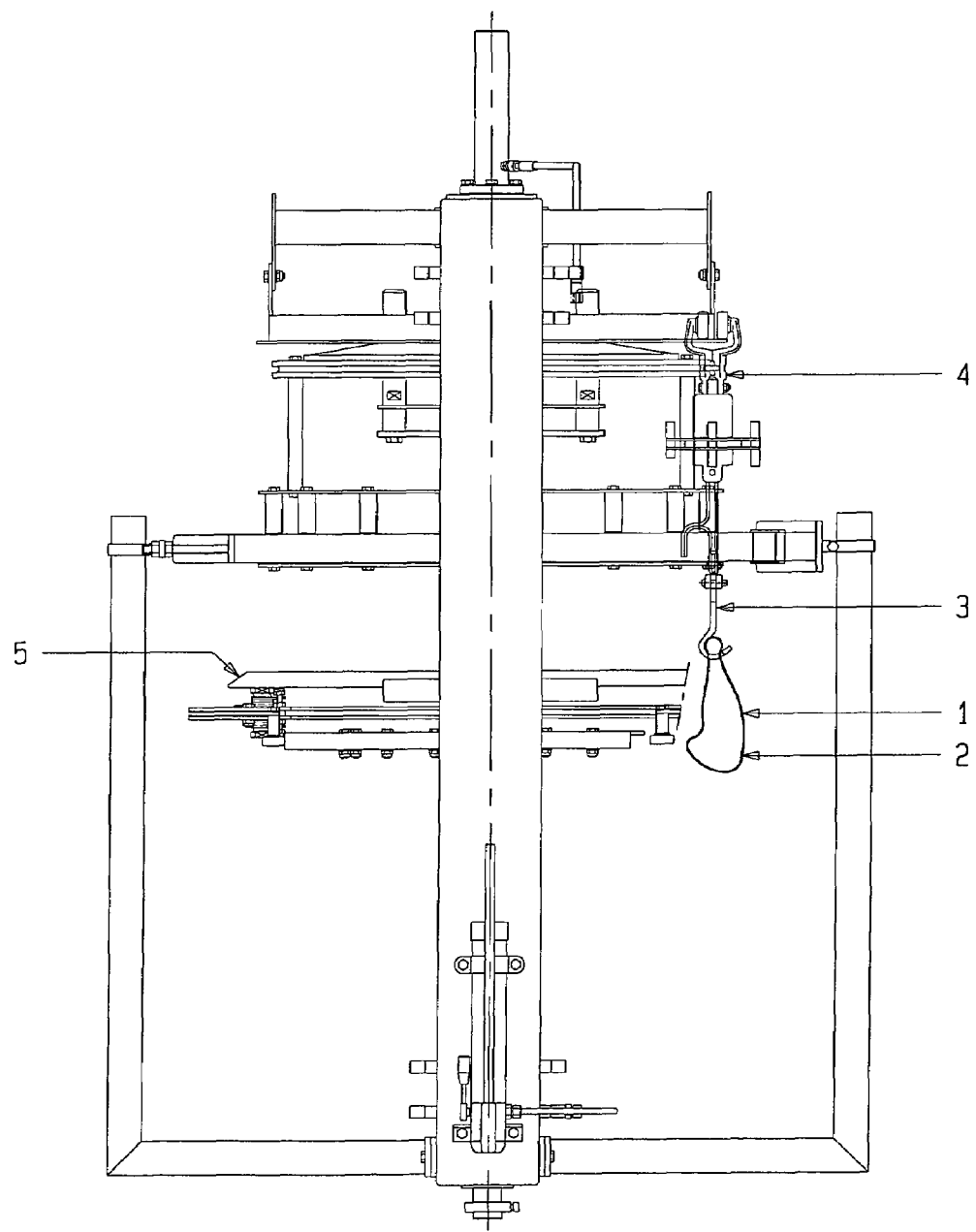
FIGS. 3A to 3E show the apparatus according to the invention in the side elevations indicated in FIG. 2.
Figure 3B:
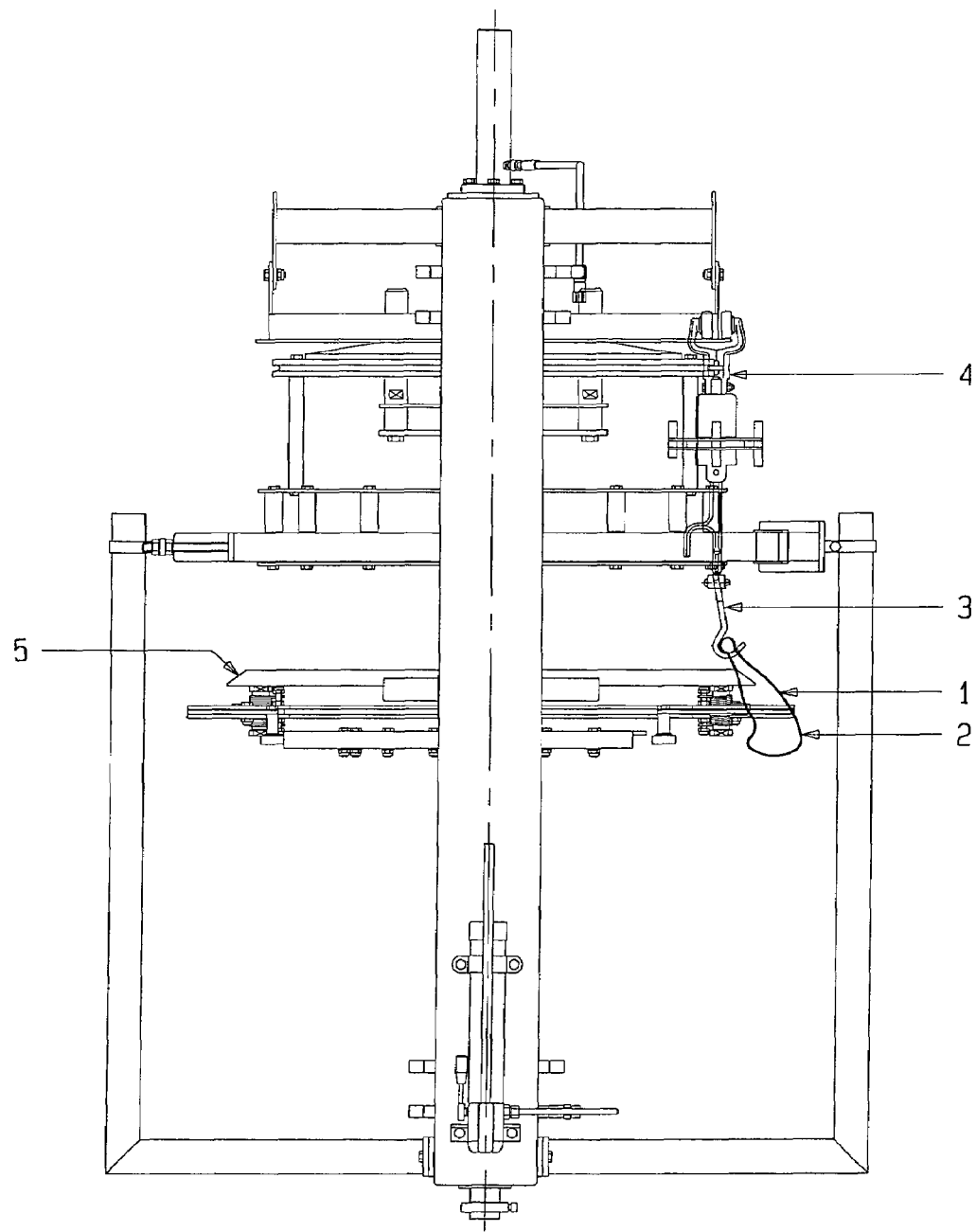
Figure 3C:
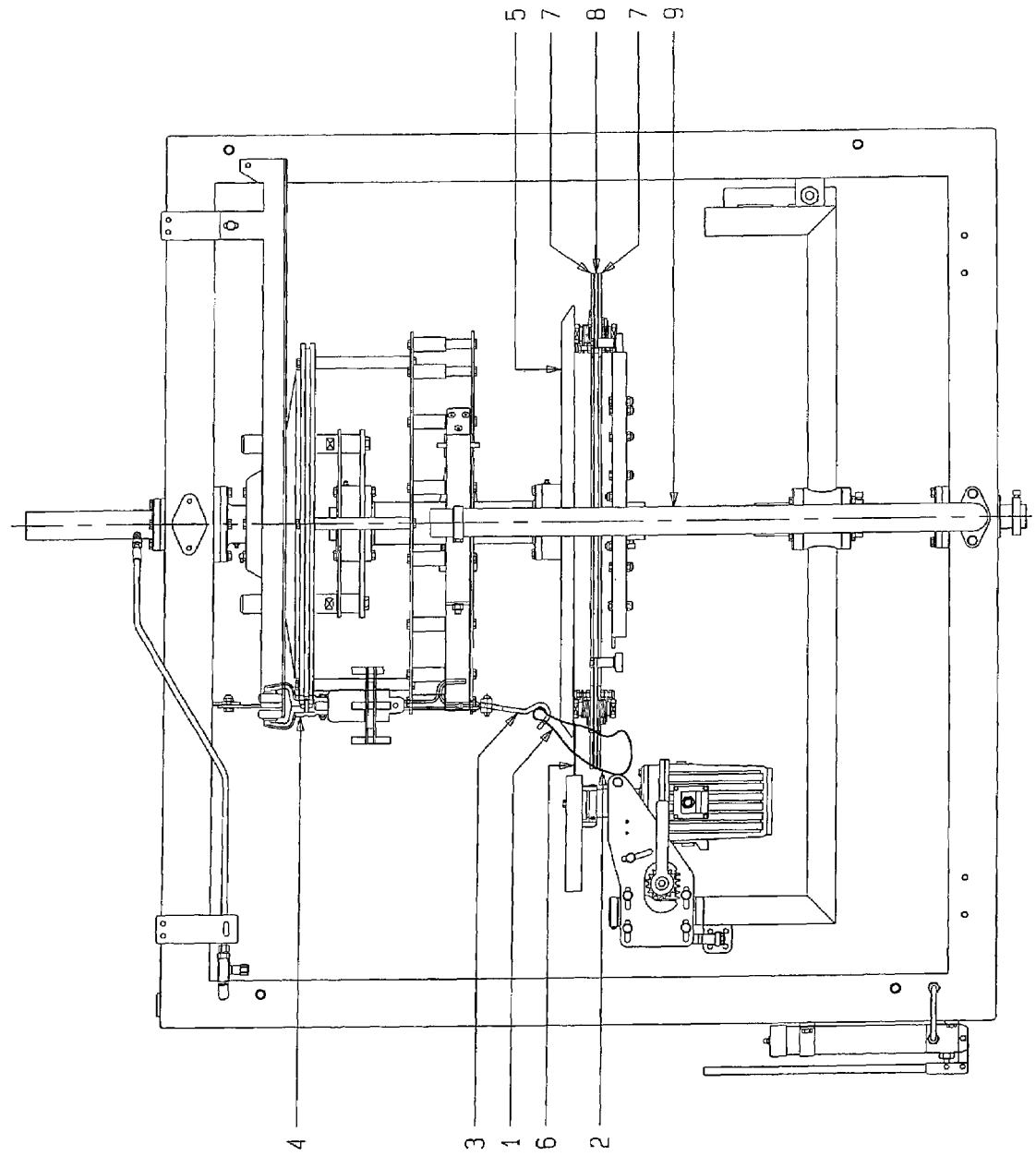
Figure 3D:
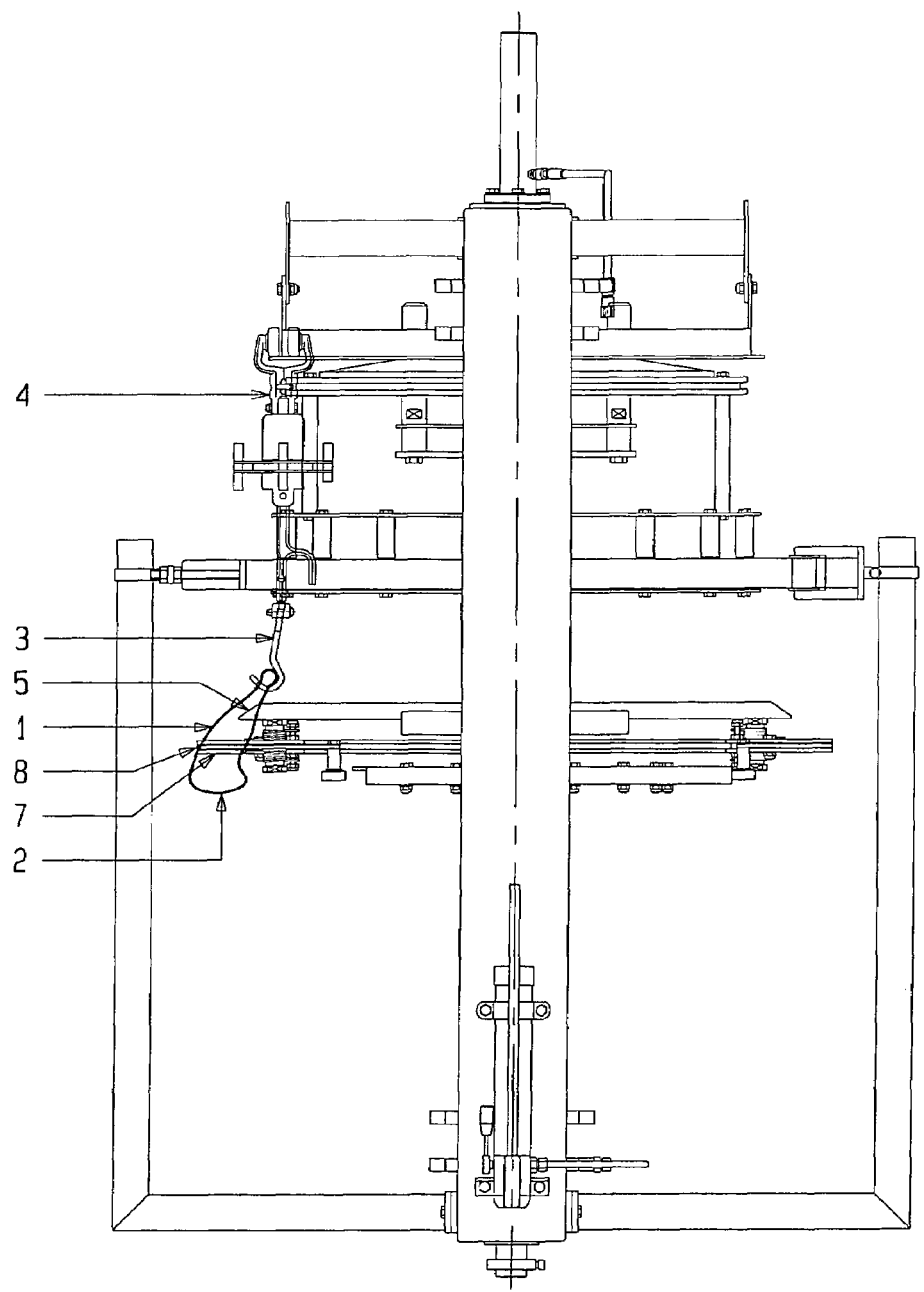
Figure 3E:
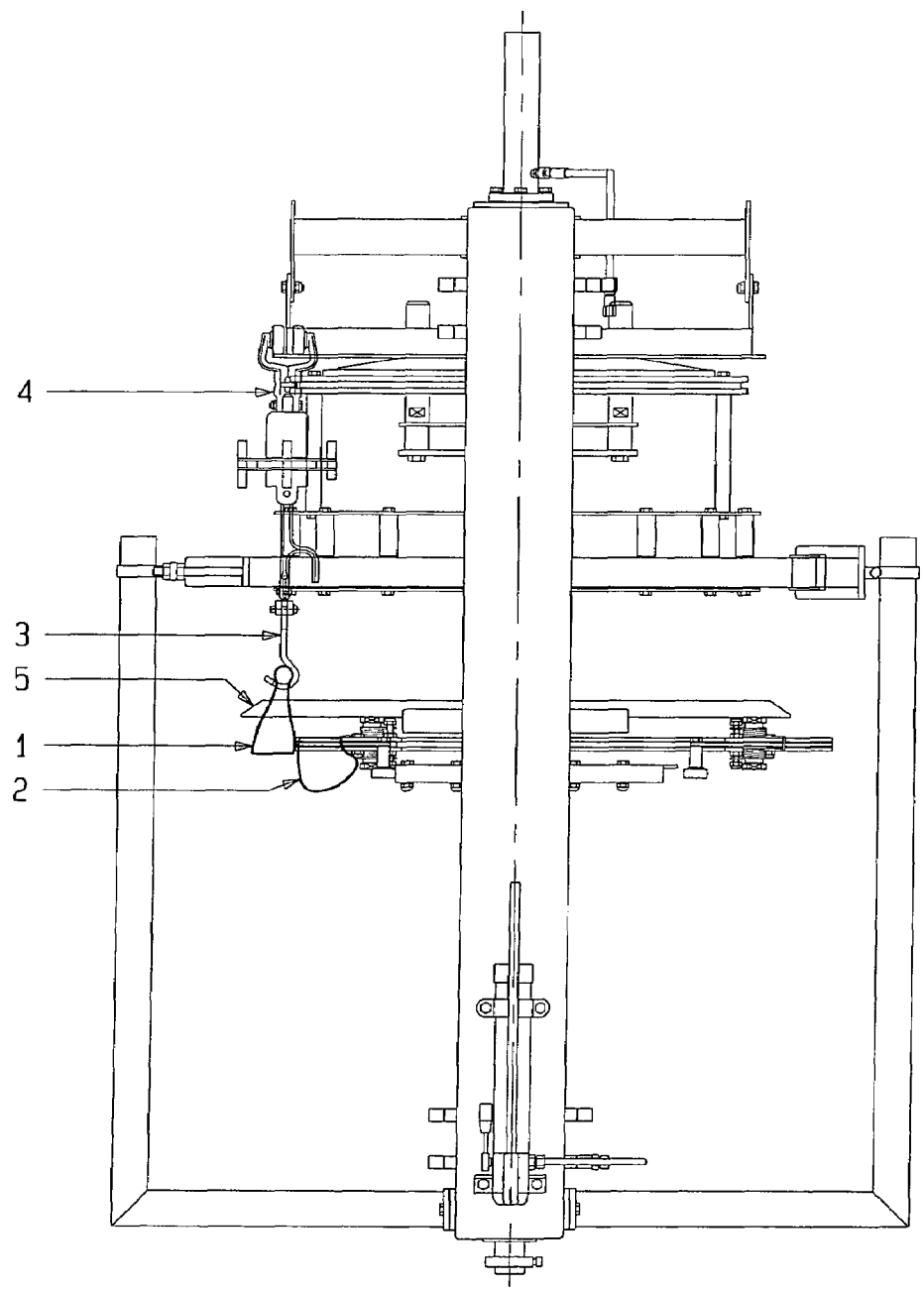

In order to elucidate what is mentioned below, the top view of the apparatus according to the invention is placed in the center of FIG. 2 while the reference letters A, B, C, D and E in the path of the severing process indicate the side elevations of the apparatus according to the invention pertaining thereto.

In the FIGS. 3A to 3E, respectively, these side elevations are shown on an enlarged scale.

The FIGS. 3A to 3E and the successive process illustrated in these figures, show that the overhead conveyor is provided with a trolley 4 with a hook 3 suspended from the trolley 4 for the leg 1, 2 of the poultry and that during operation, the clamping device 7, 8 moves synchronously with the trolley 4. To this end, the clamping chucks 7 and the clamping set 8 of the clamping device 7, 8 are positioned on a rotatable shaft 9 (FIG. 3c) whose peripheral velocity is synchronized with the speed of conveyance of the overhead conveyor.

The FIGS. 3A to 3E further show that the cutting device 6 is situated in a plane between the hook 3 and the clamping device 7, 8. This allows the clamping device 7, 8 to engage the thigh 2 of the leg 1, 2, while the drumstick 1 is held in position by the hook 3 the moment the cutting device 6 severs the drumstick 1 from the thigh 2 approximately at the height of the knee joint.

The FIGS. 3A to 3E further show that the supporting member 5 is also disposed below the hook 3 for the support of the drumstick 1 in the direction of the cutting device 6.

The FIGS. 3A to 3E further show that prior to, as well as during and immediately after passing the cutting device 6 (see FIG. 3A to 3D), the angle of the drumstick 1 in relation to the thigh 2 is maintained substantially in the unloaded, natural condition.

The clamping device 7, 8 is preferably embodied such that the same is adjustable in height, so as to allow the thigh 2 to be engaged at a suitable place, even if the length of the legs to be processed varies.

Furthermore, a detection device (for example a camera) may be provided to signal the drumstick-thigh transition, upon which the adjustment of the height of the clamping device 7, 8 and possibly of the cutting device 6, depend. The person skilled in the art is quite familiar with the way in which this is to be performed, so that any further elucidation by way of the drawing may be omitted.

It should be readily apparent to those skilled in the art that various modifications and variations may be made to the embodiments of the invention described herein without departing from the scope and spirit of the invention.

The invention claimed is:

1. An automated apparatus for severing poultry legs between the drumstick and thigh of the legs, comprising:
   a cutting device for severing the drumsticks from the thighs at a knee joint of the poultry legs as the legs are transported past said cutting device;
   an overhead conveyor positioned to carry the poultry legs past said cutting device, said overhead conveyer having a plurality of suspension elements for suspending the poultry legs by the drumsticks; and
   a clamping station having a plurality of clamping devices for holding the thighs of the poultry legs suspended from said overhead conveyor, said clamping station configured to move said plurality of clamping devices in synchronization with said suspension elements as the poultry legs are transported past said cutting device, wherein each of said clamping devices comprises at least one pair of clamping chucks and a clamping plate, whereby said clamping chucks and said clamping plate are configured for movement towards each other upon activation so that the poultry legs may be held for cutting.

2. An automated apparatus for severing poultry legs between the drumstick and thigh of the legs as in claim 1, further comprising a support device positioned below said overhead conveyor so as to engage and support the poultry legs as the drumstick and thigh are being severed.

3. An automated apparatus for severing poultry legs between the drumstick and thigh of the legs as in claim 2, wherein said support device is positioned relative to said overhead conveyor and said clamping station so as to present the poultry leg to the cutting station without applying a substantial rotational moment about the knee joint of the poultry leg.

4. An automated apparatus for severing poultry legs between the drumstick and thigh of the legs as in claim 1, wherein said overhead conveyor further comprises a plurality of trolleys to which said plurality of suspension elements are attached.

5. An automated apparatus for severing poultry legs between the drumstick and thigh of the legs as in claim 4, wherein said suspension elements comprise hooks.

6. An automated apparatus for severing poultry legs between the drumstick and thigh of the legs as in claim 4, wherein the position of said plurality of clamping devices relative to said plurality of suspension elements is adjustable such that the apparatus can be used with different sizes of poultry legs.

7. An automated apparatus for severing poultry legs between the drumstick and thigh of the legs as in claim 6, further comprising a detection device disposed along a conveying path of said overhead conveyor, said detection device configured to sense the location of the knee joint and provide a signal from which the position of at least one of said plurality of clamping devices relative to said plurality of suspension elements may be automatically adjusted.

8. An automated apparatus for severing poultry legs between the drumstick and thigh of the legs as in claim 1, wherein said at least one pair of clamping chucks are placed above one another so as to create a slot.

9. An automated apparatus for severing poultry legs between the drumstick and thigh of the poultry legs, comprising:
   a cutting device for severing the drumsticks from the thighs at a knee joint of the poultry legs as the legs are transported past said cutting device;

a transport conveyor defining a transport conveyor path that extends past said cutting device, said transport conveyor configured to convey the leg suspended from said conveyor; and a clamping conveyor defining a clamping conveyor path that extends past said cutting device, said clamping conveyor comprising a plurality of clamping devices, each said clamping device configured to move in synchronization with the transport conveyor to present the leg to said cutting device, and wherein each said clamping device comprises at least two elements configured for activated movement towards one another so that the poultry legs may be held.

10. An automated apparatus for severing poultry legs between the drumstick and thigh of the legs as in claim 9, further comprising a support device positioned below said transport conveyor so as to engage and support the poultry legs as the drumstick and thigh are being severed.

11. An automated apparatus for severing poultry legs between the drumstick and thigh of the legs as in claim 10, wherein said support device is positioned relative to said transport conveyor and said clamping conveyor so as to present the poultry leg to the cutting device without applying a substantial rotational moment about the knee joint of the poultry leg.

12. An automated apparatus for severing poultry legs between the drumstick and thigh of the legs as in claim 9, wherein said transport conveyor further comprises a plurality of trolleys, wherein each trolley has a suspension element.

13. An automated apparatus for severing poultry legs between the drumstick and thigh of the legs as in claim 12, wherein said suspension elements comprise hooks.

14. An automated apparatus for severing poultry legs between the drumstick and thigh of the legs as in claim 9, wherein the position of said plurality of clamping devices relative to said transport conveyor is adjustable such that the distance of separation may be changed.

15. An automated apparatus for severing poultry legs between the drumstick and thigh of the legs as in claim 14, further comprising a detection device monitoring said transport conveyor path, said detection device configured to sense the location of the knee joint and provide a signal from which the position of at least one of said plurality of clamping devices relative to said transport conveyor may be automatically adjusted.

16. An automated apparatus for severing poultry legs between the drumstick and thigh of the legs as in claim 9, wherein said at least two elements of each said clamping device comprises clamping chucks and a clamping plate, said clamping plate configured for movement towards said clamping chucks as said clamping devices approach said cutting device.

17. An automated apparatus for processing poultry legs having a drumstick and a thigh, comprising:

a cutting device for cutting the poultry legs at a knee joint between the drumstick and the thigh;

a poultry leg conveyor for transporting the poultry legs past said cutting device while suspended from said conveyor;

a rotatable wheel positioned adjacent to said cutting device and beneath said poultry leg conveyor, said rotatable wheel transporting a plurality of positioning devices configured to engage and secure the thighs of the poultry legs, said positioning devices moving in synchronization with said poultry leg conveyor to present the poultry legs to said cutting device, each said positioning device having at least two elements configured for being activated to move towards one another whereby a poultry leg may be held between said at least two elements; and a support device positioned in an operable plane between said poultry leg conveyor and said rotatable wheel, said support device configured for supporting the poultry legs during cutting by said cutting device.

18. An automated apparatus for processing poultry legs having a drumstick and a thigh as in claim 17, wherein said at least two elements of each said positioning device comprises a pair of clamping chucks and a clamping plate for holding the thigh of the poultry leg.

19. An automated apparatus for processing poultry legs having a drumstick and a thigh as in claim 18, wherein a vertical distance between said positioning devices and said poultry leg conveyor is adjustable.

20. An automated apparatus for processing poultry legs having a drumstick and a thigh as in claim 19, further comprising a detection system positioned proximate to said poultry leg conveyor and configured for automatically adjusting said vertical distance based upon the dimensions of the poultry legs.

* * * * *